United States Patent [19]

Fauteux et al.

[11] Patent Number: 4,925,752
[45] Date of Patent: May 15, 1990

[54] SOLID STATE ELECTROCHEMICAL CELL HAVING POROUS CATHODE CURRENT COLLECTOR

[76] Inventors: Denis G. Fauteux; Michael J. Moore; Peter M. Blonsky, all of c/o MHB Inc., 3020 Newmark Dr., Miamisburg, Ohio 45342

[21] Appl. No.: 319,434

[22] Filed: Mar. 3, 1989

[51] Int. Cl.$^5$ ............................................. H01M 6/18
[52] U.S. Cl. ................................. 429/191; 429/192; 429/217; 429/218
[58] Field of Search ............... 429/192, 191, 218, 217, 429/212, 209, 233, 242

[56] References Cited

U.S. PATENT DOCUMENTS

| | | | |
|---|---|---|---|
| 3,560,262 | 2/1971 | Baba et al. | 136/76 |
| 4,228,226 | 10/1980 | Christian et al. | 429/218 |
| 4,303,748 | 12/1981 | Armand et al. | 429/192 |
| 4,364,422 | 12/1982 | Brown et al. | 141/1.1 |
| 4,416,915 | 11/1983 | Palmer et al. | 429/218 X |
| 4,529,672 | 7/1985 | Howard et al. | 429/42 |
| 4,547,440 | 10/1985 | Hooper et al. | 429/192 X |
| 4,560,632 | 12/1985 | Alberto | 429/196 |
| 4,563,370 | 1/1986 | Menard | 427/123 |
| 4,589,197 | 5/1986 | North | 429/192 X |
| 4,654,281 | 3/1987 | Anderman et al. | 429/209 |
| 4,735,875 | 4/1988 | Anderman | 429/217 |
| 4,751,157 | 6/1988 | Uchiyama et al. | 429/194 |
| 4,751,158 | 6/1988 | Uchiyama et al. | 429/194 |
| 4,810,599 | 3/1989 | Kondo et al. | 429/191 |

FOREIGN PATENT DOCUMENTS 0145498  6/1985  European Pat. Off. .

Primary Examiner—Anthony Skapars
Attorney, Agent, or Firm—Thompson, Hine and Flory

[57] ABSTRACT

A solid state laminar electrochemical cell comprising: an alkali metal anode layer; a solid ionically conducting electrolyte layer; and a cathode/current collector layer; wherein said electrolyte layer is interposed between said alkali metal anode layer and said cathode/current collector layer and wherein said cathode/current collector layer comprises an electrically conductive substrate having a plurality of surface voids and a composite cathode composition comprising an intercalation compound, an electrically conductive filler and an ionically conductive electrolyte, said cathode composition being coated on the surface of said substrate facing said electrolyte layer and being maintained in the voids of said surface is disclosed.

12 Claims, 1 Drawing Sheet

SOLID STATE ELECTROCHEMICAL CELL HAVING POROUS CATHODE CURRENT COLLECTOR

BACKGROUND OF THE INVENTION

1. Field of the Invention

The present invention relates to the manufacture of a solid state electrochemical cell, and more particularly, a solid state cell having a lithium anode and a cathode composition/current collector element.

2. Description of the Prior Art

Solid state electrochemical devices are the subject of intense investigation and development. They are described extensively in the patent literature. See, for example, U.S. Pat. Nos. 4,303,748 to Armand; 4,589,197 to North; 4,547,440 to Hooper et al.; and 4,228,226 to Christiansen. These cells are typically constructed of an alkali metal foil anode, typically a lithium foil, an ionically conducting polymeric electrolyte, a finely divided transition metal oxide cathode, and a cathode current collector which is attached to the face of the cathode not contacting the electrolyte. The current collector usually employed is a sheet of metal foil such as aluminum, nickel, or stainless steel.

Although the above described cells have presented a viable option to older, more traditional secondary type discharge cells, the rechargeability and impedance of the cells have not achieved optimal performance. Part of the problem lies in the failure of the cathode material to form a good electric contact with the current collector. Failure of the cathode material making a good electrical contact with the current collector leads to an overall increase in cell impedance. This in turn, makes it difficult to recharge the cell.

In theory, optimal performance occurs if the cathode material is in intimate contact with the cathode current collector, and wherein the cathode current collector has a high surface area to enable uniform contact between the cathode material and the collector. Attempts have been made in the art to increase both the adherence of the cathode material to the current collector, and to increase the surface area of the current collector. However, no such attempts have been made in the field of solid state alkali metal anode cells.

For example, U.S. Pat. Nos. 4,751,157 and 4,751,158 to Uchiyama et al. disclose cathode materials for use in lithium electrochemical cells. The cathode material comprises a mixed metal oxide as an active material, along with a conductive diluent and a binder which is pressed into electrodes on a nickel screen and sintered under vacuum. The cathode materials are used in cells which contain a liquid electrolyte, and more particularly, those which contain $LiAsF_6$ in an aprotic solvent, such as methyl formate.

U.S. Pat. No. 4,416,915 to Palmer et al. discloses a chalcogenide cathode made by applying a slurry of a mixture containing at least one intercalatable layered transition metal chalcogenide cathode active material, a conductivity enhancing agent and a binding agent in a vehicle to a high porosity current collector substrate, for example, foamed metals and glasses which are 97% to 90% porous with 10 to 1000 pores per square inch and adhering the cathode material to the substrate. The cathode material is utilized in a non-aqueous lithium cell having an electrolyte comprising an electrolyte-solvent mixture.

U.S. Pat. No. 4,560,632 to Alberto discloses a molded porous cathode collector for use in non-aqueous cells. The collector includes a particulate carbonaceous conductive material bonded with a suitable binder, and having on its surface a coating of a vinyl polymer film to improve its mechanical strength and handling characteristics. The cathode collector is used in association with liquid cathode materials.

In the field of solid state lithium cells, U.S. Pat. No. 4,735,875 to Anderman et al. discloses a cell wherein a cathode material which takes the form of a microporous sheet containing polyethylene, an electrically conductive and electrochemically active particulate material and a plasticizer is laminated to a current collector such as a screen, grid, expanded metal, woven or non-woven fabric formed from efficient electron conductive materials such as carbon, or metal such as copper, aluminum, nickel, steel, lead or iron. Despite the increased surface area of the cathode collector, the Anderman et al. cell does not optimize the adherence of a cathode material to the collector as the cathode material does not necessarily interpenetrate the pores and the collector substrate.

Accordingly, there exists a need in the art for a solid state alkali metal cell wherein a highly uniform electrical contact between the cathode material and cathode current collector is maintained during operation and recharging of the cell.

SUMMARY OF THE INVENTION

In accordance with the present invention, a solid state alkali metal anode cell having significant improvements in cell impedance and, in turn, rechargeability is provided. The cell is particularly characterized by the maintenance of a tightly adherent contact between the cathode and cathode current collector of the cell.

In accordance with one embodiment, the solid state laminar electrochemical cell of the present invention comprises:-
  an alkali metal anode layer;
  a solid ionically conducting electrolyte layer; and
  a cathode/current collector layer;
wherein said electrolyte layer is interposed between said alkali metal anode layer and said cathode/current collector layer and wherein said cathode/current collector layer comprises an electrically conductive substrate having a plurality of surface voids and a composite cathode composition comprising an intercalation compound, an electrically conductive filler and an ionically conductive electrolyte, said cathode composition being coated on the surface of said substrate facing said electrolyte layer and being maintained in the voids of said surface.

In a particular embodiment, the alkali metal anode comprises a lithium foil, a lithium coated metal foil or a lithium alloy. Further, the cathode/current collector layer can take on a number of different configurations. For example, the cathode/current collector layer can comprise a cathode composition coated onto the surface and surface voids of either an electrically conductive screen, grid, foamed or expanded metal, etched foil, electrodeposited film, woven fabric or non-woven fabric.

The configuration of the cathode/current collector substrate in the form of the present invention enables superior results to be produced by the inventive cells for a number of different reasons. First, the direct adherence of the cathode material to the current collector substrate provides an intimate contact between the cathode composition and the current collector. This enables a high amount of electrical contact between the materials and as such, the efficiency of electron transfer is increased.

In addition, when the cathode composition is contained within the voids of the collector substrate, increased electrical contact occurs between the cathode composition and the collector substrate as a result of the increased surface area available for contact by the cathode composition. This too results in an overall increase in efficiency of electron transfer. Further, the cell achieves significant drop in cell impedance and a resultant improvement in rechargeability.

Accordingly, it is an object of the present invention to provide a solid state electrochemical cell capable of maintaining a low level of cell impedance and having improved rechargeability.

These, as well as other objects will become readily apparent to those skilled in the art as reference is made to the following detailed description of the preferred embodiment.

DETAILED DESCRIPTION OF THE PREFERRED EMBODIMENT

In describing the preferred embodiments, certain terminology will be utilized for the sake of clarity. It is intended that this terminology cover not only the recited embodiments, but all technical equivalents which operate in the same manner, for the same purpose, to achieve the same result.

Figure 1:
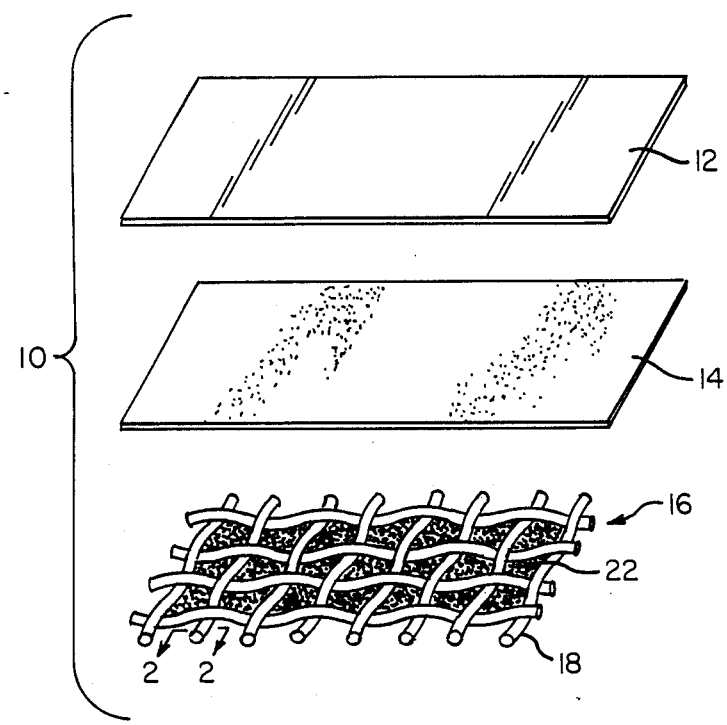
FIG. 1 is an exploded view of a cell embodying the teachings of the instant invention.

The solid state cell of the present invention is shown in FIG. 1 and designated by element 10. Cell 10 includes alkali metal anode layer 12, solid ionically conducting electrolyte layer 14, and cathode/current collector layer 16. The cell is particularly characterized by electrolyte layer 14 being interposed between alkali metal anode layer 12 and cathode/current collector layer 16.

Cathode/current collector layer 16 comprises a substrate 18 which has a plurality of surface voids 20. As shown in FIG. 1, substrate 18 is in the form of a screen or grid. However, other physical forms such as foamed states, etched foils, electroplated films, woven or nonwoven fabrics may be utilized as substrate 18. Maintained within voids 20 is cathode composition 22.

Figure 2:
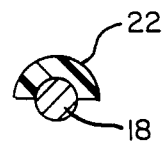
FIG. 2 is a view taken along line 2—2 of FIG. 1.

Referring now to FIG. 2, it is seen that the surface of substrate 18 which faces electrolyte layer 14 is also coated with cathode composition 22.

Laminar thin-cell batteries containing alkali metal anodes are known in the art, and those skilled in the art will appreciate that the laminar batteries of the present invention can have many constructions, such as those including a jelly roll or fan folded laminate strip design, both of which are illustrated in U.S. patent application Ser. No. 238,071, filed Aug. 30, 1988 now U.S. Pat. No. 4,879,190, which is hereby incorporated by reference. Other constructions are also available.

The alkali metal anode layer may take the form of a lithium foil, a lithium coated foil such as nickel or copper foil having a layer of lithium deposited on its surface or a lithium alloy. Lithium is a preferred anode material because it is very electropositive and light in weight. However, other alkali metal materials, such as sodium, may be practiced within the scope of the present invention.

The electrolyte layer, which is ionically but not electrically conductive, takes the form of a solid material and is laminated to the alkali metal anode layer and the cathode/current collector layer.

The preferred electrolytes are solid solutions of an ionizable alkali metal salt or an alkaline earth salt in an ionically conductive polymer. Still more preferred are solid solutions of an alkali metal salt, an ionically conductive polymer and a plasticizer or liquid electrolyte. General examples of useful ionically conductive polymers are described in U.S. Pat. No. 4,303,748 to Armand and European Application 0 145 498 to Cook. These polymers have repeating units containing at least one heteroatom such as an oxygen or nitrogen atom. They can be represented as polymers having the repeating unit

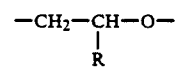

wherein R is hydrogen or a group Ra, —CH$_2$ORa, —CH$_2$OReRa, —CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula —CH$_2$—CH$_2$Op— wherein p is a number from 1 to 100, preferably 1 or 2; or having the repeating unit

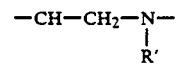

wherein R' is Ra, or ReRa, as defined above; or having the repeating unit

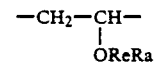

wherein Re and Ra are as defined above. Copolymers of the above polymers may also be useful.

It has been found particularly desirable to prepare these electrolytes using a radiation curable composition which includes a monomer of the formulae:

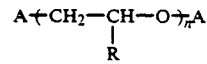

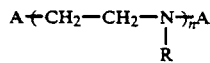

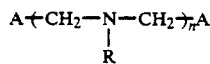

where n is about 3 to 50 and R is hydrogen or a C1-C3 alkyl group which are terminated by ethylenically unsaturated moieties or glycidyl moieties represented by A. This method is described in U.S. patent application Ser. No. 115,492, filed Oct. 30, 1987 now abandoned. A particularly useful group of compounds is obtained by reacting a polyethylene glycol with acrylic or methacrylic acid. Polyethylene glycol diacrylate is a particularly preferred polymer. To provide additional structural integrity, triacrylate prepolymers may be added.

Preferably, the ionically conductive polymeric materials have a molecular weight of about 200 to 800. Still more preferably they are liquids at temperatures less than 30° C.

As to the ionizable salt, formula MX, this is not limiting at all, and is the type in which:

$M+ = Li^+, Na^+, K^+, Ca^{2+}, Mg^{2+}, NH_4^+$ $X- = I-, ClO_4-, BF_4-, AsF_6-, CF_3SO_3-, CF_3CO_3-, B_{12}H_{12}^{2-}, B_{10}C_{10}^{2-}, B_4-$, designating $C_6H_5$, or an alkyl or an aryl chain.

To produce a solid electrolyte material, the solid solution of the ionizable salt and polymer is mixed with the radiation curable composition and the mixture is cured by exposure to actinic radiation, preferably electron beam or ultraviolet radiation. If ultraviolet radiation is used for curing, an ultraviolet photoinitiator may be added to the composition.

The cathode/current collector layer includes a cathode material which is coated on the surface and in the voids of a current collector material.

Cathode compositions are known in the art. Typically they comprise an intercalation compound, an ionically conductive solid polymer electrolyte containing solution of an alkali metal salt or alkaline earth salt as defined above, and an electrically conductive filler. A typical formulation may contain about 25 to about 70 parts by weight of intercalation compound, about 2 to about 15 parts of an electrically conductive filler, and about 15 to about 75 parts of the ionically conductive solid solution.

The following compounds have been taught in the art for use as intercalation compounds: $V_6O_{13}$, $MoO_2$, $MnO_2$, $V_2O_5$, $TiS_2$, $MoS_3$, $Cr_3O_6$, $Li_xV_3O_8$, $V_3O_8$, $VS_2$, $NbSe_2$, $FeOCl$, $CrOBr$, $TiNCl$, $ZrNCl$, $HfNBr$, $FeS$, $NiS$, $CoO$, $CuO$ and $WO_2$. $V_6O_3$ is particularly preferred. For use as an electrically conductive filler, carbon may be used.

In addition to providing a matrix for containing the alkali metal salt, the ionically conductive polymer additionally functions as a binder material to enable the cathode composition to adhere to the collector substrate. Because of its adhesive qualities, acrylated polyethylene oxide is the preferred ionically conductive polymer. For use as an additional adhesive, acrylated polyesters may be selected.

Useful collector substrates having a plurality of surface voids include either carbon, copper, aluminum, nickel, steel, lead and iron materials, or combinations thereof, in the following configurations:

- foamed nickel or similar foamed metals
- foamed glass that has been plated with an inert or noble metal to increase surface conductivity
- foamed polymers containing a surface or bulk conductivity agent
- foamed Ti-, Nb-, Zr-, W-, Ta-carbides
- foamed molybdenum disilicide
- reduced metal reacted molecular or carbosieves
- chemically etched metal foils
- electrodeposited films
- carbon, graphite or vitreous carbon fiber or fibril laminates of ultrahigh surface area. Foamed metals in the form of a mesh or grid and chemically etched metal foils are preferred substrates.

To produce the cathode/current collector material, the materials used to form the cathode composition are mixed together and coated onto the surface of the current collector substrate facing the electrolyte layer. Typically, this may involve heating the collector substrate to a temperature ranging between about 23° C. and about 70° C., applying the cathode composition, in solid form onto the substrate, and cooling the entire assembly so that the cathode composition tightly adheres to the collector substrate, ensuring a good contact between the materials. Alternatively, if the solid solution is maintained in a radiation curable composition, the cathode composition/collector substrate may be exposed to actinic radiation to cure the radiation curable composition to the collector substrate.

It is particularly desired that the cathode composition fill the surface voids of the collector substrate. This provides a greater amount of electrical contact area between the electrically conductive material of the cathode composition and the current collector substrate. This increased contact enables an overall increased cell efficiency to be achieved as a result of a significant drop in cell impedance. The improved efficiency is particularly noticeable during cell recharging.

The completed cell may be manufactured utilizing any of a number of different methods. For example, once each of the anode layer, electrolyte layer and cathode/current collector layer are manufactured, they may be laminated together to form a solid state cell. Lamination typically occurs by the application of heat and pressure.

Alternatively, however, the electrochemical device can be assembled "wet" and then cured in situ. For example, a lithium coated foil member can be coated with the radiation polymerizable electrolyte composition and overcoated with the cathode coating composition/current collector substrate. These structures can be cured by exposure to electron beam or another source of actinic radiation.

Thus, in one method the current collector substrate may be coated with a radiation polymerizable cathode composition in accordance with the present invention. This structure is overcoated with a layer of the radiation polymerizable electrolyte composition described above and assembled with an anodic member such as a lithium foil member or a lithium coated nickel or aluminum member. This assembly may be cured by exposure to electron beam to provide an electrochemical cell. The cured electrolyte and cathode compositions adhere to one another as well as to the metal members associated with the anode and cathode.

The process described above can also be reversed. An anodic metal foil member such as lithium coated metal foil can be coated with the radiation polymerizable electrolyte composition described above. A radiation polymerizable cathode composition is coated over the current collector and is assembled with the anode and electrolyte layers. The assembly is subjected to electron beam radiation to produce an electrochemical cell in accordance with the present invention.

In another process, the anodic foil member or the current collector substrate may be coated with the appropriate cathode or electrolyte composition and that composition may be cured (e.g., by exposure to radiation when it is radiation curable). The cured composition may be overcoated with the other of the electrolyte or cathode composition thereafter, and the overcoating may be cured or the remaining anodic foil member or current collector substrate may be laminated and then the overcoating cured.

The invention is illustrated in more detail by the following non-limiting example(s)

COMPARATIVE EXAMPLE 1

A cell was produced by first forming a cathode mixture including 45% by weight $V_6O_{13}$, 4% carbon and 51% of an electrolyte including 70% propylene carbonate, 3% polyethylene oxide, 6% $LiCF_3SO_3$ and 21% of a radiation curable acrylate. This mixture was coated onto a 15 micron thick solid nickel foil current collector to a thickness of about 75 microns. The above defined electrolyte was then coated onto the cathode to a thickness of about 50 microns. A 100 micron thick lithium foil was then laminated onto the electrolyte and the entire structure was subjected to electron beam radiation to cure the cathode and electrolyte. The initial cell impedance at 1 Hz was measured to be about 110 ohms.

EXAMPLE 2

A cell having the identical cathode, electrolyte and anode of Comparative Example 1 was produced by using a 35 micron thick nickel foil which was etched to provide a roughened surface as the current collector. The measured impedance at 1 Hz was 12 ohms.

EXAMPLE 3

A cell having the identical cathode, electrolyte and anode of Comparative Example 1 was produced by using a porous 200 micron thick nickel felt as the current collector. The measured cell impedance at 1 Hz was 8 ohms.

COMPARATIVE EXAMPLE 4

A cell was prepared identical to the cell of Comparative Example 1 with the exception that the cathode contained 53% $V_6O_{13}$, 8% carbon and 39% electrolyte. The measured cell impedance at 1 Hz was 15 ohms.

EXAMPLE 5

A cell having the identical cathode, electrolyte and anode of Comparative Example 4 was produced using the current collector of Example 2 The measured impedance at 1 Hz was 5 ohms.

EXAMPLE 6

A cell having the identical cathode, electrolyte and anode of Comparative Example 4 was produced using the current collector of Example 3. The measured impedance was 5 ohms.

EXAMPLE 7

The cell of Comparative Example 4 was discharged at 200 microamperes/cm² at room temperature to lower the voltage from 3 V to 1.5 V. The discharge time was 15 hours.

EXAMPLE 8

The experiment of Example 7 was repeated using the cell of Example 5. The discharge time was 17.5 hours.

EXAMPLE 9

The experiment of Example 7 was repeated using the cell of Example 6. The discharge time was 21 hours.

Having described the invention in detail and by reference to preferred embodiments thereof, it will be apparent that modifications and variations are possible without departing from the scope of the appended claims.

What is claimed is:

1. A solid state laminar electrochemical cell comprising:

an alkali metal anode layer;
a solid ionically conducting electrolyte layer; and
a cathode/current collector layer;

wherein said electrolyte layer is interposed between said alkali metal anode layer and said cathode/current collector layer and wherein said cathode/current collector layer comprises an electrically conductive substrate having a plurality of surface voids and a radiation cured composite cathode composition comprising an intercalation compound, an electrically conductive filler and a radiation cured ionically conductive electrolyte, said cathode composition being coated and radiation cured on the surface of said substrate facing said electrolyte layer and being maintained in the voids of said surface.

2. The cell according to claim 1 wherein said anode layer comprises lithium foil, a metal foil coated with a layer of lithium or a lithium alloy.

3. The cell according to claim 1 wherein said electrolyte layer comprises a layer of a solid solution of an ionizable alkali metal salt or an alkaline earth salt and an ionically conductive polymer.

4. The cell according to claim 3 wherein said ionically conductive polymer contains a repeating unit selected from the group consisting of:

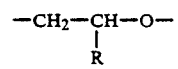

wherein R is hydrogen or a group Ra, $-CH_2ORa$, $-CH_2OReRa$, $-CH_2N(CH_3)_2$, in which Ra is an alkyl group containing 1 to 16 carbon atoms and preferably 1 to 4 carbon atoms or a cycloalkyl group containing 5 to 8 carbon atoms, and Re is an ether group of formula $-CH_2-CH_2Op-$ wherein p is a number from 1 to 100, preferably 1 or 2;

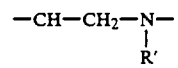

wherein R' is Ra, or ReRa, as defined above; and

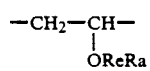

wherein Re and Ra are as defined above.

5. The cell according to claim 3 wherein said salt is a salt of a metal cation selected from the group consisting of $Li^+$, $Na^+$, $K^+$, $Mg^{2+}$, $Ca^{2+}$ and $NH_4^+$, and an anion selected from the group consisting of $I^-$, $ClO_4^-$, $BF_4^-$, $AsF_6^-$, $CF_3SO_3^-$, $CF_3CO_3^-$, $B_{12}H_{12}^{2-}$, $B_{10}Cl_{10}^{2-}$, and B 4—, where is $C_6H_5$, an alkyl chain or an aryl chain, and wherein said salt cation and said salt anion are maintained in stoichiometric amounts.

6. The cell according to claim 3 wherein said polymeric material comprises polyethylene oxide.

7. The cell according to claim 1 wherein said intercalation compound is selected from the group consisting of $V_6O_{13}$, $MoO_2$, $MnO_2$, $V_2O_5$, $TiS_2$, $MoS_3$, $Cr_3O_6$, $Li_xV_3O_8$, $V_3O_8$, $VS_2$, $NbSe_2$, $FeOCl$, $CrOBr$, $FeS$, $NiS$, $CoO$, $CuO$.

8. The cell according to claim 1 wherein said electrically conductive filler comprises carbon particles.

9. The cell according to claim 1 wherein said ionically conductive electrolyte of said cathode composition comprises a polymer containing a solid solution of an ionizable alkali metal salt or alkaline earth salt.

10. The cell according to claim 9 wherein said polymer comprises acrylated polyethylene oxide.

11. The cell according to claim 1 wherein said highly electrically conductive substrate comprises a substrate in the form of a screen, grid, foamed or expanded state, etched foil, electrodeposited film, woven fabric or non-woven fabric.

12. The cell according to claim 11 wherein the material of said electrically conductive substrate is selected from the group consisting of carbon, copper, aluminum, nickel, steel, lead and iron and combinations thereof.

* * * * *